United States Patent
Deshpande et al.

(10) Patent No.: US 9,584,736 B2
(45) Date of Patent: Feb. 28, 2017

(54) AUTOMATIC REPOSITIONING OF VIDEO ELEMENTS

(75) Inventors: Nikhil Deshpande, Pennington, NJ (US); Smadar Gefen, Yardley, PA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 981 days.

(21) Appl. No.: 13/242,167

(22) Filed: Sep. 23, 2011

(65) Prior Publication Data

US 2013/0076984 A1    Mar. 28, 2013

(51) Int. Cl.
*H04N 5/272* (2006.01)

(52) U.S. Cl.
CPC .......... *H04N 5/272* (2013.01); *H04N 5/2723* (2013.01)

(58) Field of Classification Search
CPC ............................. H04N 5/272; H04N 5/2723
USPC ........................................................ 348/699
See application file for complete search history.

(56) References Cited

U.S. PATENT DOCUMENTS

| | | |
|---|---|---|
| 5,264,933 A | 11/1993 | Rosser et al. |
| 5,491,517 A | 2/1996 | Kreitman et al. |
| 5,543,856 A | 8/1996 | Rosser et al. |
| 6,750,919 B1 * | 6/2004 | Rosser .................. H04N 5/272 348/584 |
| 6,954,498 B1 | 10/2005 | Lipton |
| 2002/0075407 A1 * | 6/2002 | Cohen-Solal ................ 348/565 |
| 2003/0169366 A1 | 9/2003 | Lenzi |
| 2008/0226253 A1 | 9/2008 | Steinberg et al. |
| 2009/0028439 A1 * | 1/2009 | Elangovan et al. .......... 382/209 |
| 2009/0185046 A1 * | 7/2009 | Sugihara .................... 348/222.1 |
| 2010/0050082 A1 * | 2/2010 | Katz et al. ..................... 715/719 |
| 2012/0007869 A1 * | 1/2012 | Falash et al. ................. 345/473 |
| 2012/0314077 A1 * | 12/2012 | Clavenna et al. ............ 348/159 |

* cited by examiner

*Primary Examiner* — Peter D Le
(74) *Attorney, Agent, or Firm* — Fay Kaplun & Marcin, LLP

(57) ABSTRACT

A system and method for automatically repositioning virtual and physical elements in a scene. The system and method being configured to receive a video frame, receive data, including position data, describing a first element to be imaged in the video frame, receive data, including position data, describing a second element to be imaged in the video frame, assign a dynamic status to the first element and automatically reposition at least the first element to create a modified video frame.

18 Claims, 5 Drawing Sheets

AUTOMATIC REPOSITIONING OF VIDEO ELEMENTS

FIELD OF THE INVENTION

The exemplary embodiments relate to systems and methods that automatically reposition virtual and physical elements in a scene, so their image in the video is not conflicting. Specifically, when a virtual element's insertion region, as may be determined live during an event, occludes one or more elements, either virtual or physical elements, a repositioning of conflicting elements will take place automatically. Moreover, in addition to repositioning, structural modification of elements may be performed to accommodate spatially nearby elements.

BACKGROUND INFORMATION

Due to the employment of augmented reality technologies carried out by video insertion systems the experience of viewing many types of programs, including sporting events, has been enhanced by the ability to insert virtual enhancements (also referred to as inserts, graphics, logos, or indicia) into a particular location of the video image that a viewer is watching on television. For instance, in football, a First Down Line (FDL) is inserted into the real time broadcast of a game to signify the point on the field that the team currently on offense must drive towards in order to be awarded four more downs. In another example, a Down and Distance (DnD) arrow denoting the play number and the distance left to reach the FDL is inserted. While these virtual elements' positions and appearances are determined live based on game progression, other virtual elements may be unrelated to the game events, such as advertising indicia inserted at various areas on the field of play or on various stadium structures like a stadium wall.

An insertion system is a system and method for inserting graphics (virtual elements) into a live video broadcast in a realistic fashion on a real time basis. Generally, the perspective of the camera is being continuously estimated so that graphical elements, either 2D or 3D, may be projected to the video image from the current camera's perspective as if these graphical elements were located at a pre-determined position and orientation in the scene.

Live broadcast Video Insertion Systems (VIS) were developed and are used commercially for the purpose of inserting advertising and other indicia into video sequences, including live broadcasts of sporting events. An example of such a live broadcast VIS is used commercially under the trade name L-VIS®. In further examples, live broadcast VIS are described in U.S. Pat. Nos. 5,264,933, 5,543,856 to Rosser et al., and U.S. Pat. No. 5,491,517 to Kreitman et al., which are hereby incorporated by reference in their entirety. These VIS, to varying degrees of success, seamlessly and realistically incorporate indicia into the original video in real time. Realism is maintained even as the camera changes its perspective throughout the event coverage and taking into account moving elements in the scene that may occlude the inserted indicia.

FIG. 1 shows a top level block diagram of a typical VIS 100. The main VIS computing component 120 receives a live video feed 110 from a camera and then outputs, possibly with some latency, an enhanced video 115. In addition, the system includes a GUI component 150 with which an operator controls the system before and during an event and an indicia unit 170 where representations of the inserted virtual elements are stored.

At the heart of each insertion system is the capability to associate a point 226 in the scene to its projection in the video image space 246, as illustrated in FIG. 2. Generally, the scene's model is known. For example, a football field's dimensions are defined within 3D coordinate space 210, and its scene's model includes the 3D location of each distinctive landmark (e.g., lines 225, junction points 226, etc.) in the field. The field's X-Y plane 210 shows an insertion region denoted by the 3D coordinates—$P_1$, $P_2$, $P_3$, and $P_4$. This insertion region is associated with a virtual element (e.g., 2D graphic) that is to be inserted 240 into the current video image 230 from the current camera perspective. Hence, a camera projects the scene into its image space 230, with a projection dictated by the camera's parameters (e.g. focal length, position, orientation, etc.). Once this camera's parameters are known, any region 220 within the real-world space 210 may be projected into the camera's image space 240. Estimation of the camera's parameters, in turn, requires knowledge of fiducial points (landmarks in the scene, e.g. 225 and 226, and their corresponding points in the image, e.g. 245 and 246). The way in which a typical VIS, continuously and in real time, estimates the current camera's parameters (referred to herein as the camera's model) and uses it to virtually insert indicia is described in detail below.

Finding pairs of corresponding points, where landmarks in the field are matched with their projections in the current video frame, starts with the recognition process as performed by recognition and tracking module 125. Via processing of the current video image, unique features such as lines, conics, junctions, corners, etc., are detected. Based on their geometrical structure, appearance, or any other attributes their correspondence with landmarks in the scene model is determined. This recognition process may be carried out every several frames. For the frames that occur between the recognition process, tracking of the detected features by the recognition and tracking module 125 may maintain their correspondence with scene's landmarks. Next, based on the found corresponding pairs, the current camera's model may be estimated using camera model estimator module 130. As mentioned before, a camera's model is a mathematical operator (matrix) that maps a 3D point from the scene space 210 to its corresponding point in the video image space 230. The camera's model is composed of intrinsic parameters, such as focal length, and extrinsic parameters, such as the camera's position and orientation (pan, tilt, and rotation).

Having the current camera's model estimate, the warping unit 135 warps (projects) a given virtual element at a given 3D pose into the current video image space 230. For instance, a virtual element may be a logo. This logo may be represented in the indicia database 185 by its image (e.g. BMP or GIF format) and its desired location (insertion region) within the scene's 3D space: $P_1$, $P_2$, $P_3$, and $P_4$. The warping unit 135 will then warp this logo's image, using the camera's model, into a new indicium image within the current video image space: $C_1$, $C_2$, $C_3$, and $C_4$; this new indicium image is then ready to be rendered into the video image by the mixer 145. Note that, a virtual element is not limited to a 2D graphic, but may be any 3D structure. In this case, a 3D virtual element representative data in the indicia database 185 may be its 3D model (polygonal mesh or point-based representation), texture, and desired position, orientation, and scale in the scene. Similarly, knowledge of the current camera's model may be used to render this 3D element from this camera perspective.

Next, the occlusion mask generator 140 generates a transparency function or mask key, that is then applied to the insertion process at the mixer 145 to properly account for any obstacles that may be present in the insertion region. By performing an occlusion processing prior to insertion, VIS 100 ensures that the verisimilitude of the inserted logo into the video image is preserved when a physical element like a player steps into the insertion region. Rather than occlude the player with the inserted logo, the transparency function or mask key ensures that at every pixel location where an overlap occurs between the player and the logo, the pixel corresponding to the logo is suppressed in favor of the pixel of the image of the player. Hence, at the mixer 145 the warped indicia images are superimposed with the video image based on the occlusion mask.

An operator, via a GUI component 150, controls the insertion processing system 120. Before the game, the operator sets and trains the system, preparing it for the live event. Typically, the operator enters data regarding the scene usually via graphical interface. The operator defines the 3D coordinates of landmarks in the scene within a 3D coordinate system of the scene modeling unit 155. For example, in a sporting event the field structure 210 will be entered. The operator may also train the system to recognize color characteristics of the dynamic foregrounds (players) and color characteristics of the static background (field) using color modeling unit 160. This data will be used later for occlusion mask generation. Other information the operator typically enters into the system is the desired insertion 3D location and orientation using the indicia positioning unit 165 of each virtual element stored in the indicia database 185. As will be explained below, depending on the type of indicia, this information may be entered during pre-event setting or during the game.

In the VIS systems described above, particularly, though not exclusively, in VIS systems capable of inserting a virtual element into a dynamically determined insertion region, a problem arises when this element is inserted into an area of the video image that should not be occluded. For instance, in a football game, a virtual logo should not occlude the name of the team in the end zone, or, in a baseball game, the logo should not cover an actual (as opposed to virtual) advertisement on the stadium wall. In prior systems, the responsibility for doing so fell on the manual operator who had to reposition the inserted logo so as to not interfere with any portion of the image that ought to remain visible during the broadcast. Such manual repositioning has the unfortunate side effect of delaying the insertion of the logo in its desired position to such an extent that the viewer notices the sudden appearance of the logo in the image as if out of nowhere. Such a visually noticeable delay destroys the seamlessness and realism that are the intended hallmarks of VIS's.

DETAILED DESCRIPTION

Figure 1:
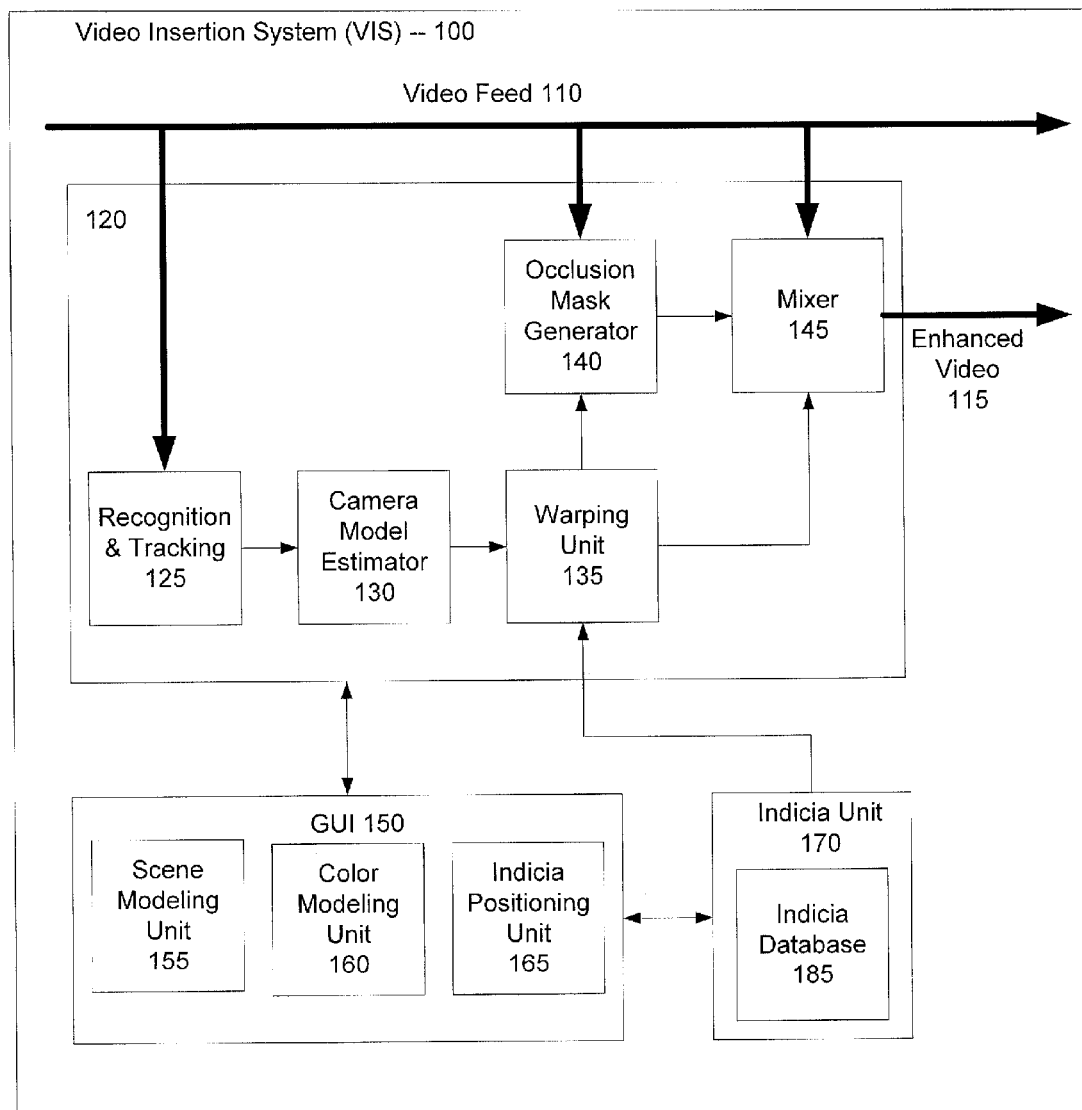
FIG. 1 shows a conventional live broadcast video insertion system.
Figure 2:
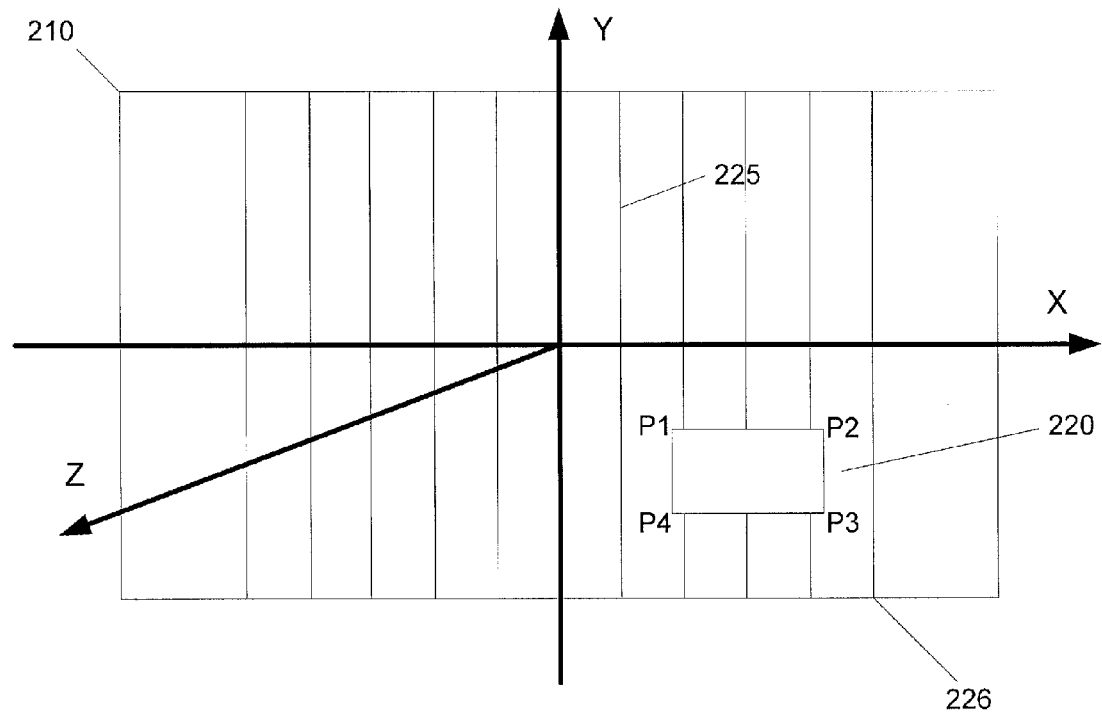
FIG. 2 shows an exemplary real-world model of a scene and an image projection of it.
Figure 2:
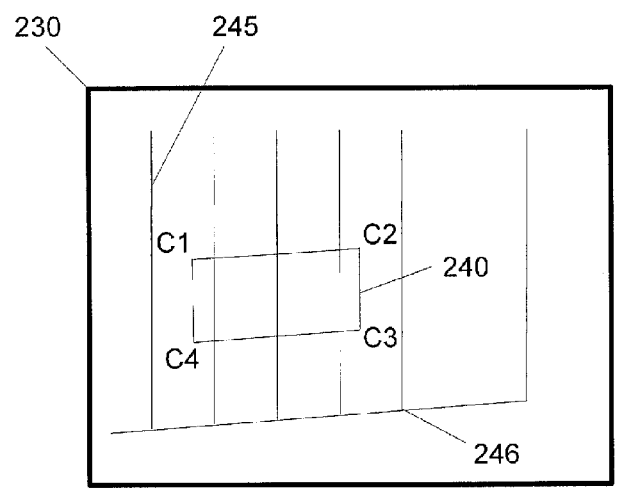

The exemplary embodiments may be further understood with reference to the following description of the exemplary embodiments and the related appended drawings, wherein like elements are provided with the same reference numerals. The exemplary embodiments are related to systems and methods for resolving conflicting indicia display in live or pre-recorded video signals in which inserted indicia (e.g., represented by virtual elements) and existing indicia (e.g., represented by physical elements) are spatially interfering with each other and therefore automatically repositioned within the video image. In this description, the term "imaged" when used to refer to the elements of the video frame (e.g., either the virtual elements or the physical elements) means that the video frame, when displayed, is intended to show these elements. However, this does not mean that the exemplary embodiments described herein require that the video frame be displayed. That is, the processing of the video frame and the elements may be carried out without any actual display of the video frame.

In the above description, it was noted that there are many examples of systems and methods for the insertion of indicia into video sequences and the above provided several examples of such systems and methods. However, it is noted that the exemplary embodiments are not limited to such systems and methods. That is, as will be described in more detail below, the exemplary systems and methods may be applied to any type of insertion system. It is also noted that in the above description and in the following description, the exemplary event sites are described as sporting events sites. However, the exemplary embodiments are not limited to such remote event sites. It may be that the exemplary embodiments are implemented for a studio show, for instance.

Figure 3:
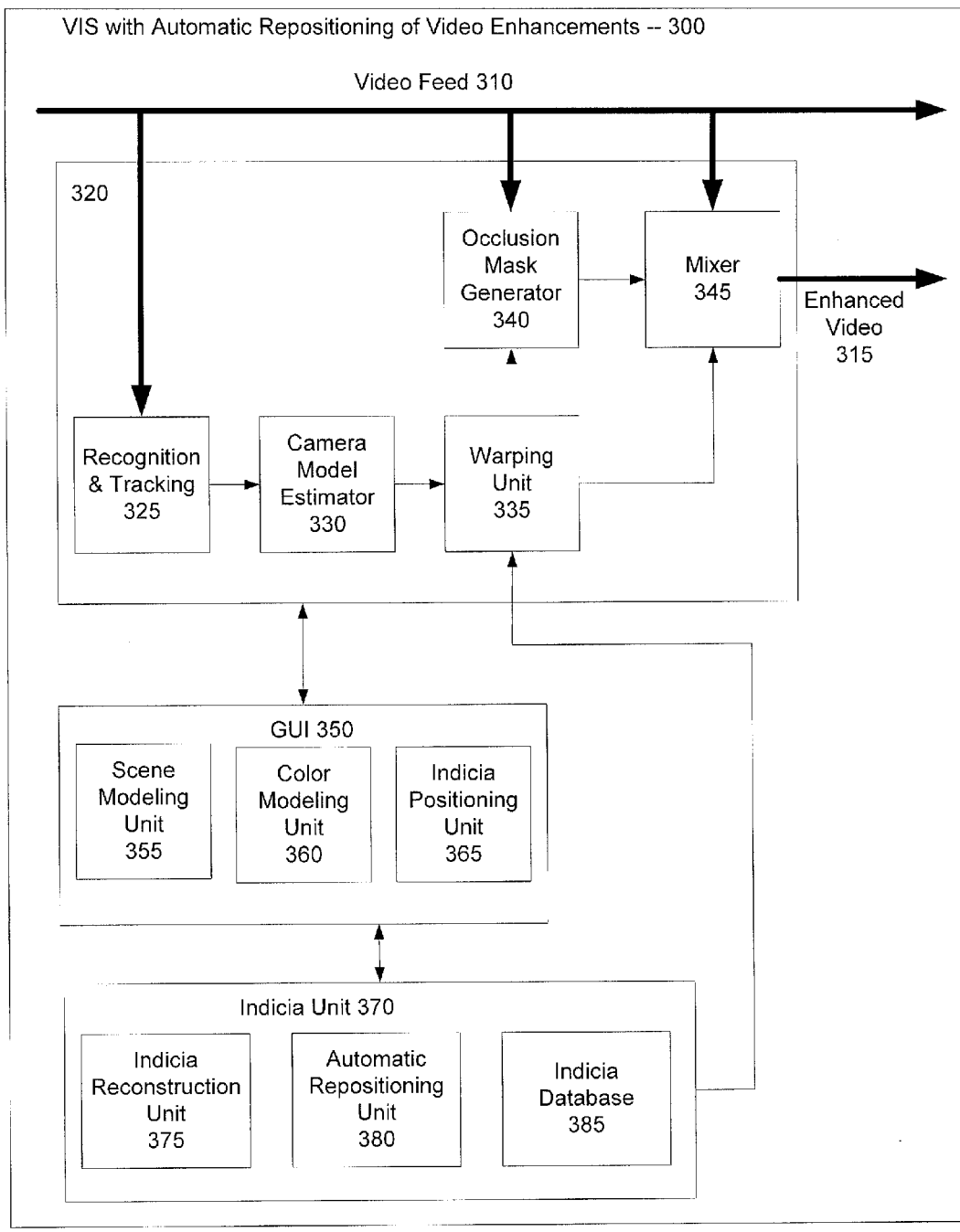
FIG. 3 shows a live broadcast video insertion system with automatic repositioning of video enhancements according to an exemplary embodiment.

FIG. 3 shows a VIS 300 equipped with functionality to ensure that an indicia is inserted at a location in the video image that avoids occluding any other virtual or physical elements that are part of the scene. Throughout this description, the term "virtual element" will be used to refer to a 3D computer representation of a computer-generated graphic. Examples of virtual elements include the FDL and DnD described above, but may also include advertisements and other types of graphics. Also, throughout this description, the term "physical element" will be used to refer to a 3D computer representation of a actual object. Examples of objects represented by physical elements include indicia that is painted on the field of play (e.g., team name in endzone, team logo at midfield, etc.) and indicia that is posted to court side boards. Thus, when the term "element" is used, this may refer to either, or both, of physical elements and virtual elements.

The VIS 300 may be located in any suitable location in the program production system for creating a broadcast program. For instance, the VIS 300 may be located in a production truck at the venue being filmed, or remotely at a production studio. Moreover, the VIS 300 is not limited to video signals of live events, but may be applied to pre-stored programs stored on any suitable medium, such as magnetic tape, optical disc, or flash memory storage.

Figure 4:
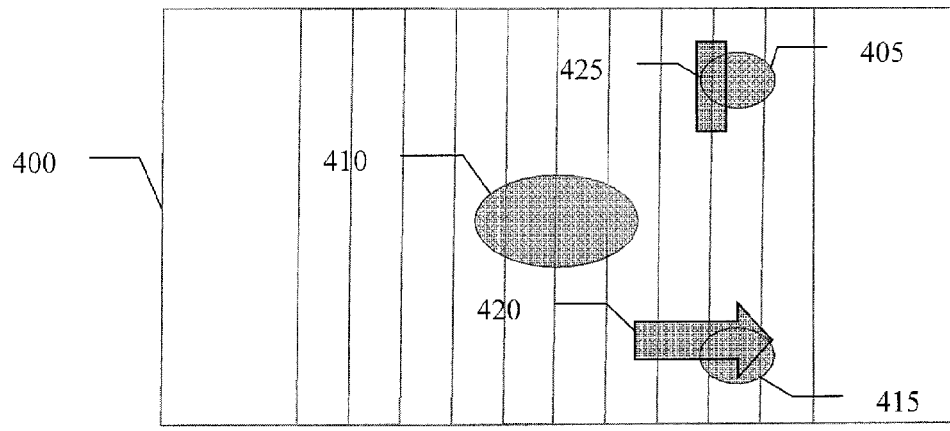
FIG. 4 illustrates repositioning of a virtual arrow element relative to physical elements on the field plane according to an exemplary embodiment.
Figure 4:
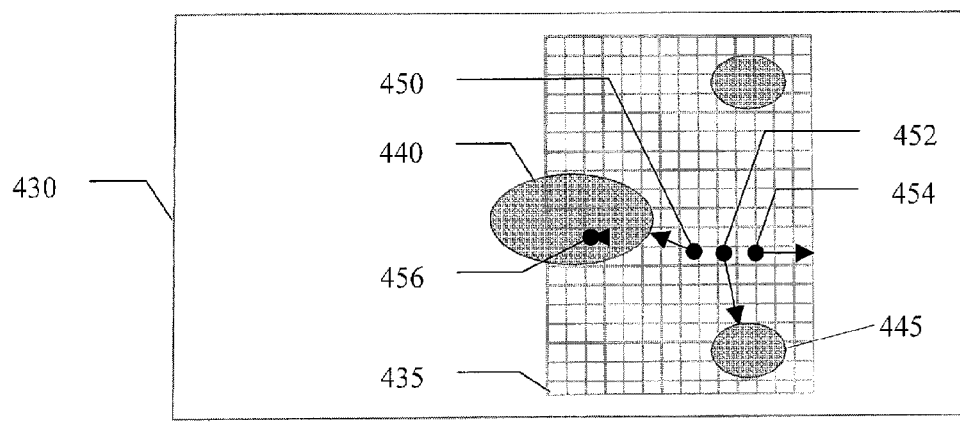
Figure 4:
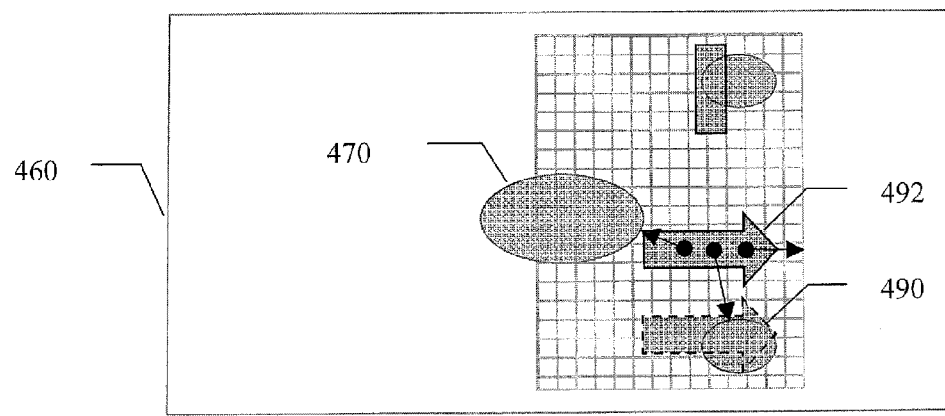

According to an exemplary embodiment the automatic repositioning of video enhancements resides primarily in the indicia unit 370, including an indicia reconstruction unit 375, an automatic repositioning unit 380, and an indicia database 385. As illustrated in FIG. 4, a typical situation in a production where augmented reality is employed is having a plurality of elements within the scene 400. Some of these elements may be graphics that are physically posted on the field plane, such as physical elements 405, 410, and 415. Some of these elements may be graphics that are virtually inserted on the field plane, possibly in a location dictated by a game's events, such as the DnD 420 arrow and other enhancement element 425 (virtual elements). For instance, during the game the operator enters via GUI 350 the desired location of the DnD 420 arrow that is processed by the indicia positioning unit 365, and, as shown in scene 400, the DnD 420 graphic may occlude another element 415 in the field. To resolve this issue, an exemplary method automatically repositions the elements in the field according to predefined rules as will be explained in greater detail below.

Prior to the event, physical elements are modeled to facilitate their possible "removal" from the scene and re-insertion into a new location in the scene. A physical element remodeling takes place in the indicia reconstruction unit 375. For instance, prior to the game, a physical element corresponding to a team's logo is generated by capturing the team's logo image and mapping it onto the scene's 3D space. In addition, a background element (a second physical element) representing the field's pattern and marks that are covered by the physical element encompassed region is generated. Thus, in the indicia database 385, every stored physical element has a background element associated with it. During the game, when there is a need to "move" a physical element, the insertion system will be directed to insert the associated background element at the same location of the physical element and then insert the physical element at the new desired location.

Figure 5:
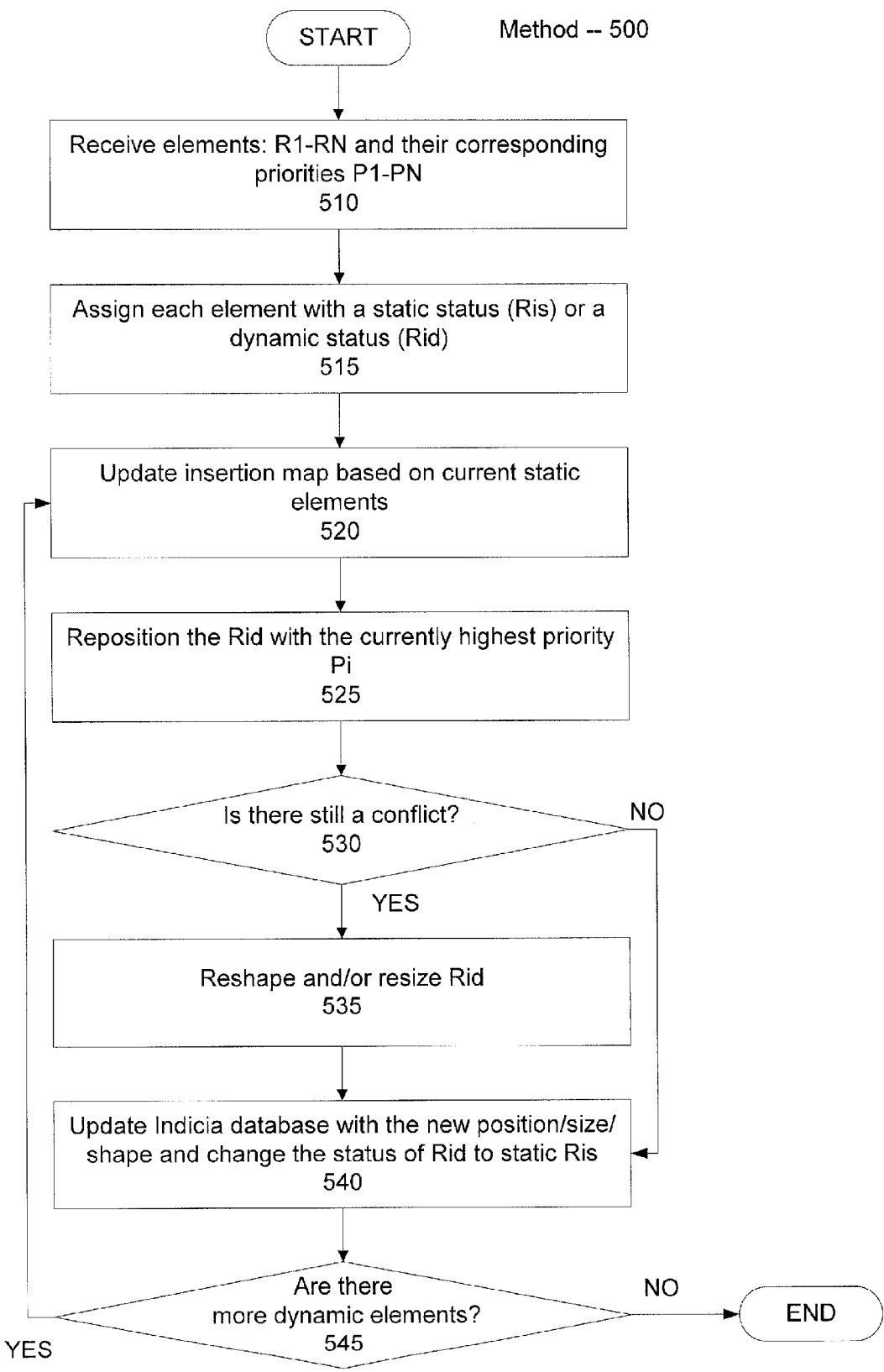
FIG. 5 shows an exemplary flow diagram for automatically repositioning virtual and physical elements according to pre-determined constraints and so that their encompassed regions will not overlap.

FIG. 5 shows a block diagram of an exemplary automatic repositioning method 500 that may primarily reside in the automatic repositioning unit 380 of the VIS 300. For each video frame, before employing insertion, the automatic repositioning method 500 receives a list of elements and their associated data from the indicia database 385. As mentioned before, elements in the list may be either physical or virtual, and may be either two-dimensional or three-dimensional. An element's associated data includes its location, dimension, and orientation within the scene's 3D space and its appearance model—either planar texture for a 2D element or a polygonal mesh and texture templates for a 3D element. For simplicity of the description, the method is illustrated in FIG. 4 using 2D elements.

In step 510, all the elements—denoted by $R_1 \ldots R_N$, with their assigned priorities—denoted by $P_1 \ldots P_N$ are received. An element's priority may be set by an operator during system setup, for example. In step 515, the elements are assigned either a static status, $R_i^s$, or a dynamic status, $R_i^d$, where static elements will stay in place while dynamic elements may be repositioned according to this method. Assigning static or dynamic status may be done as follows. The elements' encompassed regions and their relative spatial distance are analyzed to detect a conflict. A "conflict" may be any situation where it is desirable to move or position one element with respect to the position of another element, including situations where elements are overlapping, where elements are too close to each other, or any other situation defined by priorities or a predetermined rule. If a group of elements found to be overlapping with each other, the element with the highest priority will be assigned a static status, and all the other elements will be assigned a dynamic status. For instance, elements 405, 410, 415, 420, and 425, may be designated priorities 5, 4, 3, 2, 1, respectively. In this case, elements 405, 410, and 415 are assigned a static status and elements 420 and 425 are assigned a dynamic status. Meaning that in this situation, first, element 420 will be repositioned, and second, element 425 will be repositioned, since element 420 has a higher priority relative to element 425. It is noted that in this example, the physical elements 405, 410, 415 have been assigned a higher priority than the virtual elements 420 and 425. However, this is only exemplary and there may be cases where virtual elements are assigned higher priorities than physical elements. The assignment of priorities for elements may be based on any number of rules or practices adhered to by the operator. For example, it could be that physical elements receive higher priorities. In another example, certain advertisers may pay to have their virtual elements have a higher priority than other advertisers or even physical elements. As can be seen from these examples, the assigning of priorities to elements may be specific to the operator of the system.

Repositioning of the dynamic elements is carried out in steps 520 and 525. The exemplary embodiment describes a specific mechanism to reposition an element. However, those skilled in the art may contemplate other equivalent repositioning mechanisms. In step 520 an insertion map is computed based on the current static elements. As illustrated in scene 430 an insertion map is defined within a certain region of interest ("ROI") 435. Grid points 450-454 are assigned a value representing a distance to the closest boundary of either a static element or the ROI boundary (e.g., grid point 450 is closest to static element 440, grid point 452 is closest to static element 445 and grid point 454 is closest to the boundary of the ROI 435). The value of grid points located within a static element's region 456 or outside of the ROI is zero. The grid resolution may depend on the desired repositioning step size. Such desired repositioning step size may be settable by a user.

Next, in step 525, the element $R_i^d$ with the highest priority 420 is selected from the current list of dynamic elements to be repositioned as follows. The insertion map's area that overlaps with the $R_i^d$ region will be summed up to a value denoted as $A_i^d$. One can observe that $A_i^d$ becomes larger as $R_i^d$ 420 moves away from the static elements 405-415 and from the ROI 435 boundaries. Therefore, repositioning $R_i^d$ may be carried out through a maximization process of $A_i^d$. This process is illustrated in scene 460 where the DnD arrow moves from its current position 490 to its new position 492. Finding the new position of $R_i^d$ for which $A_i^d$ is maximized may be done through an exhaustive search or through known in the art optimization methods such as gradient-decent, simulated annealing, genetic algorithm, etc. The ROI 435 may be used to constrain the repositioning. Such a constraining feature may be useful where more than one element is needed to be repositioned, as will be explained below. Those of skill in the art will understand that while the ROI 435 is useful in the repositioning elements, it is not necessary. In such a case, the element may be positioned to any location within the scene.

In step 530 it is determined whether after repositioning of $R_i^d$ this element's region still overlaps with the other static elements' encompassed regions. If this is affirmative, in step 535, the size or shape of the element may be modified. For example, the DnD arrow may be decreased in size to accommodate the surrounding elements. Another possibility is to allow some degree of transparency when rendering the overlapping regions of $R_i^d$. In step 540, the new position, and, possibly, new size and structure of the current dynamic element $R_i^d$ are stored into the indicia database 385 and the status of the element changes to static. At this point, in step 545, if there are more dynamic elements, the method repeats from step 520 where the insertion map is updated based on the current list of static elements. As described above, the previously repositioned dynamic element 420 is now assigned a static status. In this second pass, for instance, the repositioning of dynamic element 425 will take place relative to the now static elements 405, 410, 415, and 420.

As mentioned before, the ROI 435 that bounds the insertion map is defined to serve as a constraint to limit the repositioning extent of a dynamic element. For example, in the case of a DnD arrow, only motion in the Y direction may be allowed. In another example, if there are two dynamic elements, such as elements 420 and 425, a possible repositioning scheme may be to define for each one of them a separate ROI where motion will be limited within each one's ROI.

In an exemplary embodiment a pseudo-element may be defined and fed (together with the other physical or virtual elements) into the method described in FIG. 5. This pseudo-element, when assigned a static status, for instance, may be serving as a "place holder" preventing other elements from occupying the same region occupied by this element. Preventing insertion of virtual elements or repositioning of physical elements into or from a certain area on the court/field, respectively, may be instrumental in making sure the elements are not interfering with foreground objects such as players. One or more pseudo elements, for example, may be introduced into the system during a limited time segment optionally tied to a specific event.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. The hardware platform may also be a standard video processing platform and its associated hardware and software components. In a further example, the exemplary embodiments of the insertion systems and methods may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
   receiving from a camera a video frame imaging a scene;
   receiving data describing a plurality of elements to be positioned in the scene, wherein the data for each of the elements includes an element real-world structure and an element real-world position in the scene;
   analyzing the data describing the plurality of elements to determine an existence of a conflict between at least one of the element real-world structures of two or more elements and the element real-world positions of the two or more elements;
   when a conflict exists, resolving the conflict by automatically modifying the data of at least one of the two or more elements,
   wherein the automatically modifying the data is performed by maximizing a summed value of an area of an insertion map that overlaps with the at least one of the two or more elements; and
   inserting, at a perspective of the camera, the at least one of the two or more elements into the video frame, according to the modified data.

2. The method of claim 1, wherein at least one of the elements is a physical element representative of an actual object at the scene imaged in the video frame, the method further comprising:
   modeling the actual object to create the physical element;
   creating a background element corresponding to the physical element, wherein the background element is representative of a background that is covered by the actual object; and
   inserting the background element into the video frame when the data describing the physical element is modified.

3. The method of claim 1, wherein at least one of the elements is a virtual element that is representative of a computer-generated graphic.

4. The method of claim 1, wherein at least one of the elements is a pseudo-element.

5. A system, comprising:
   a memory storing data describing a plurality of elements to be positioned in a scene, the scene is imaged in a video frame received from a camera, wherein the data for each of the elements includes an element real-world structure and an element real-world position in the scene; and
   an automatic repositioning unit configured to
   analyze the data describing the plurality of elements to determine an existence of a conflict between at least one of the element real-world structures of two or more elements and the element real-world positions of the two or more elements;
   when a conflict exists, resolve the conflict by automatically modifying the data of at least one of the two or more elements,
   wherein the automatically modifying the data is performed by maximizing a summed value of an area of an insertion map that overlaps with the at least one of the two or more elements; and
   insert, at a perspective of the camera, the at least one of the two or more elements into the video frame, according to the modified data.

6. The system of claim 5, wherein at least one of the elements stored by the memory is a physical element representative of an actual object at the scene imaged in the video frame, wherein the automatic repositioning unit
   models the actual object to create the physical element,
   creates a background element corresponding to the physical element, wherein the background element is representative of a background that is covered by the actual object and
   inserts the background element into the video frame when the data describing the physical element is modified.

7. The system of claim 5, wherein at least one of the elements is a virtual element that is representative of a computer-generated graphic.

8. The method of claim 1, wherein the data describing the plurality of elements further includes one or more of size, appearance, and transparency data.

9. The method of claim 1, wherein the automatically modifying the data is performed in an order defined by priorities assigned to the elements.

10. The method of claim 9, wherein an advertisement associated with an element from the plurality of elements is priced based on the assigned priorities.

11. The method of claim 1, wherein the conflict includes two or more conflicting elements, and further wherein the elements overlap one another when inserted into the video frame, and wherein resolving the conflict includes modifying the real-world structure and position in the scene of at least one of the overlapping elements.

12. The method of claim 1, wherein the method further comprises:
- defining at least one element from the plurality of elements as a static element, and wherein the data describing the static element is not modified;
- defining the other elements from the plurality of elements as dynamic elements, wherein the data describing the dynamic elements is modified relative to the data describing the at least one static element; and
- after modifying the data describing one dynamic element from the dynamic elements, defining the one dynamic element as a static element.

13. The system of claim 5, wherein the data describing the plurality of elements further includes one or more of size, appearance, and transparency data.

14. The system of claim 5, wherein the automatic repositioning unit is further configured to perform the automatically modifying the data in an order defined by priorities assigned to the elements.

15. The system of claim 5, wherein the automatic repositioning unit is further configured to:
- define at least one element from the plurality of elements as a static element, and wherein the data describing the static element is not modified;
- define the other elements from the plurality of elements as dynamic elements, wherein the data describing the dynamic elements is modified relative to the data describing the at least one static element; and
- after modifying the data describing one dynamic element from the dynamic elements, define the one dynamic element as a static element.

16. The system of claim 5, wherein the conflict includes two or more conflicting elements, and further wherein the elements overlap one another when inserted into the video frame, and wherein resolving the conflict includes modifying the real-world structure and position in the scene of at least one of the overlapping elements.

17. The system of claim 5, wherein at least one of the elements is a pseudo-element.

18. The system of claim 14, wherein an advertisement associated with an element from the plurality of elements is priced based on the assigned priorities.

* * * * *